(12) United States Patent
Sip et al.

(10) Patent No.: US 7,997,399 B2
(45) Date of Patent: Aug. 16, 2011

(54) CLUTCH

(75) Inventors: Kim-Yeung Sip, Shenzhen (CN); Xiong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/422,301

(22) Filed: Apr. 13, 2009

(65) Prior Publication Data

US 2010/0163365 A1  Jul. 1, 2010

(30) Foreign Application Priority Data

Dec. 26, 2008 (CN) .......................... 2008 1 0306588

(51) Int. Cl.
*F16D 43/25* (2006.01)
(52) U.S. Cl. ................ 192/82 T; 192/69.71; 192/107 M
(58) Field of Classification Search ............... 192/69.71, 192/82 T, 107 M
See application file for complete search history.

(56) References Cited

U.S. PATENT DOCUMENTS

| | | | | |
|---|---|---|---|---|
| 294,672 A | * | 3/1884 | Huckins et al. | 192/48.5 |
| 3,889,314 A | * | 6/1975 | McCabe | 16/48.5 |
| 4,040,304 A | * | 8/1977 | McCabe | 192/12 D |
| 4,962,836 A | * | 10/1990 | Martin | 192/58.684 |

* cited by examiner

*Primary Examiner* — David D Le
*Assistant Examiner* — Huan Le
(74) *Attorney, Agent, or Firm* — Frank R. Niranjan

(57) ABSTRACT

A clutch includes a driving member and a driven member. The driving member includes a rotatable shaft and four breaking blocks radially fixed to the rotatable shaft. Each breaking block includes a thermally deformable main body including an engaging surface, and a heating element and an engaging block formed on the engaging surface. The driven member includes a mounting surface and defines four engagement-receiving portions and a through hole in the mounting surface. The four engagement-receiving portions are positioned and shaped so as when the driving member is assembled to the driven member the four engaging blocks are correspondingly engaged with the four engagement-receiving portions. The rotatable shaft is rotatably inserted through the through hole. The heating element is configured for heating the breaking block to force it to bend the engaging blocks away from the engagement-receiving portions to disengage the clutch.

11 Claims, 5 Drawing Sheets

ોા# CLUTCH

BACKGROUND

1. Technical Field

The disclosure relates to a clutch.

2. Description of Related Art

A clutch is a device for enabling two rotating bodies to be engaged or disengaged. Current clutches typically include a complicated gear arrangement to engage or disengage the rotating bodies and this increases the cost of the clutches and causes mechanical noise.

Therefore, it is desirable to provide a clutch which can overcome the above-mentioned problems.

DETAILED DESCRIPTION

Figure 1:
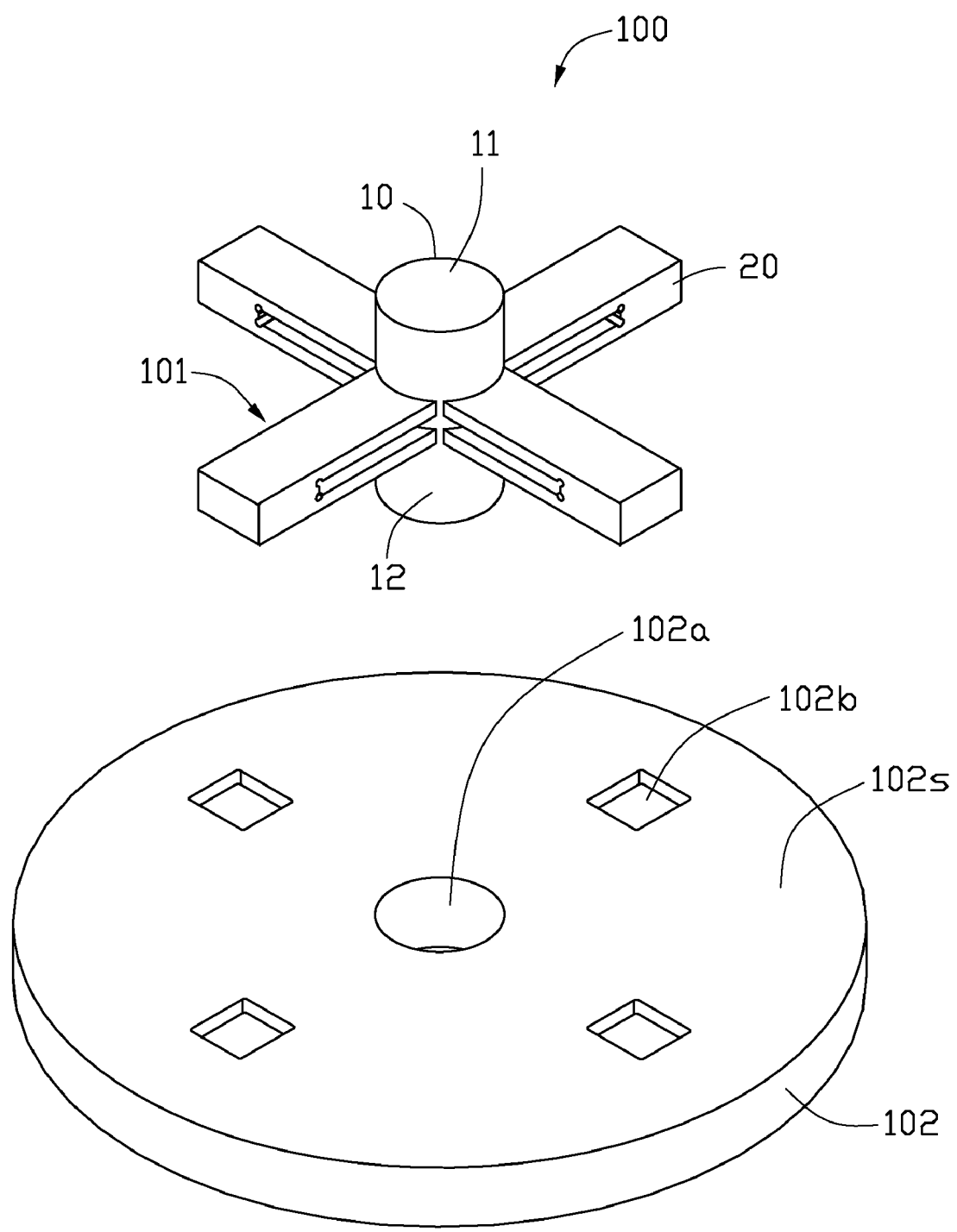
FIG. 1 is an exploded, isometric, schematic view of a clutch, according to an exemplary embodiment.

Referring to FIG. 1, a clutch 100, according to an exemplary embodiment, is disclosed. The clutch 100 includes a driving member 101 and a driven member 102. The driving member 101 is configured for connecting to a driving device (not shown) such as a motor shaft. The driven member 102 is configured for connecting to a driven device (not shown) such as a drill chuck.

Figure 2:
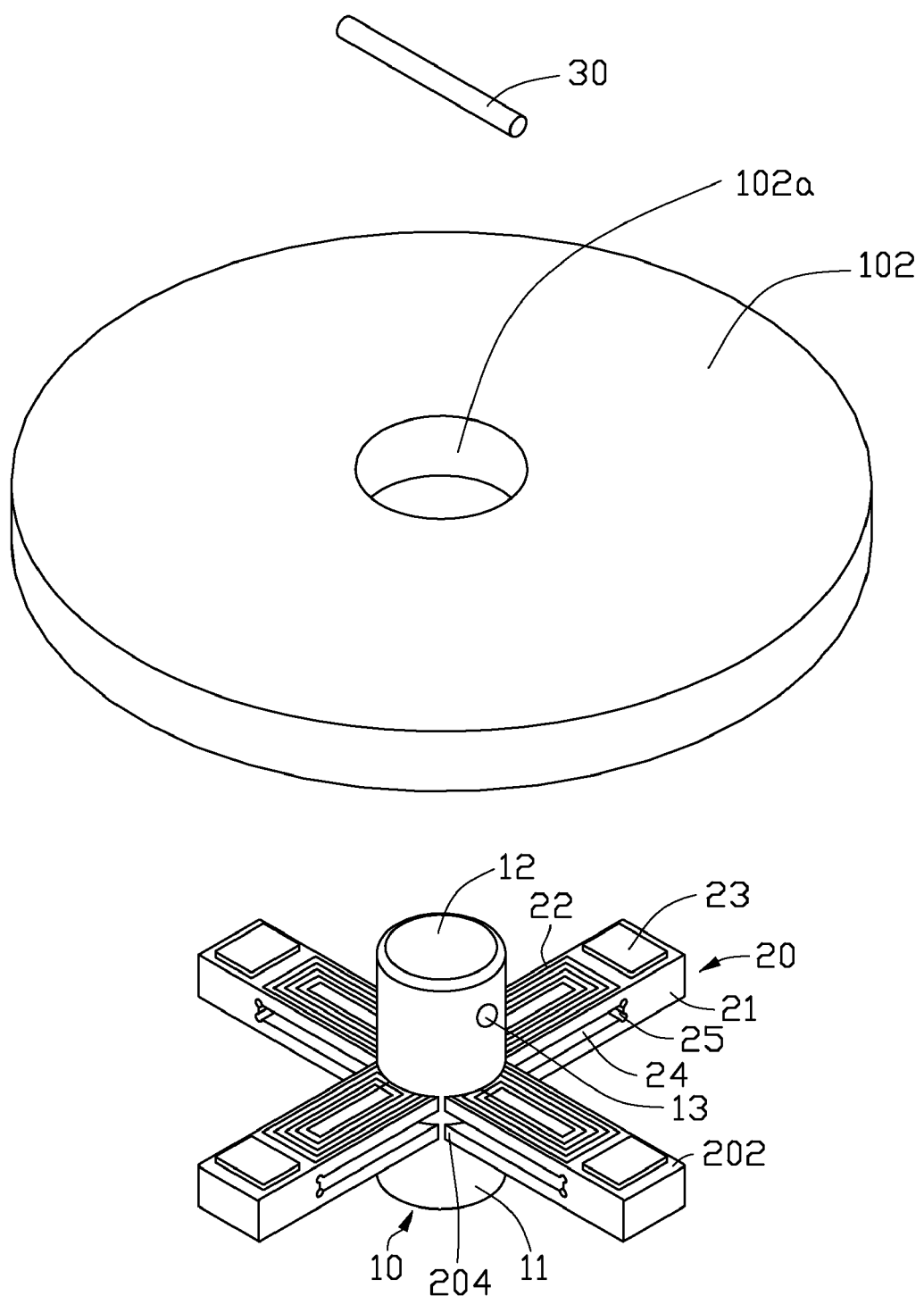
FIG. 2 is similar to FIG. 1, but viewed from a reverse direction.

Also referring to FIG. 2, the driving member 101 includes a rotatable shaft 10, four breaking blocks 20, and a holding member 30 such as a locking pin. The four breaking blocks 20 are fixed to the rotatable shaft 10. The holding member 30 is longer than the diameter of the rotatable shaft 10.

The rotatable shaft 10 includes a first end 11 and a second end 12. In addition, the rotatable shaft 10 defines a first through hole 13 and four block-receiving portions 14 (see FIG. 3). The first through hole 13 extends substantially along a diameter of the rotatable shaft 10, adjacent to the second end 12. The diameter of the first through hole 13 is a little larger than the diameter of the holding member 30. The four block-receiving portions 14 are defined in the cylindrical surface of the rotatable shaft 10 adjacent to the first end 11. Each two adjacent block-receiving portions 14 are about 90 degrees from each other. In this embodiment, each block-receiving portion 14 is constituted by two first slots, each extending parallely along the circumference of the rotatable shaft 10.

Figure 5:
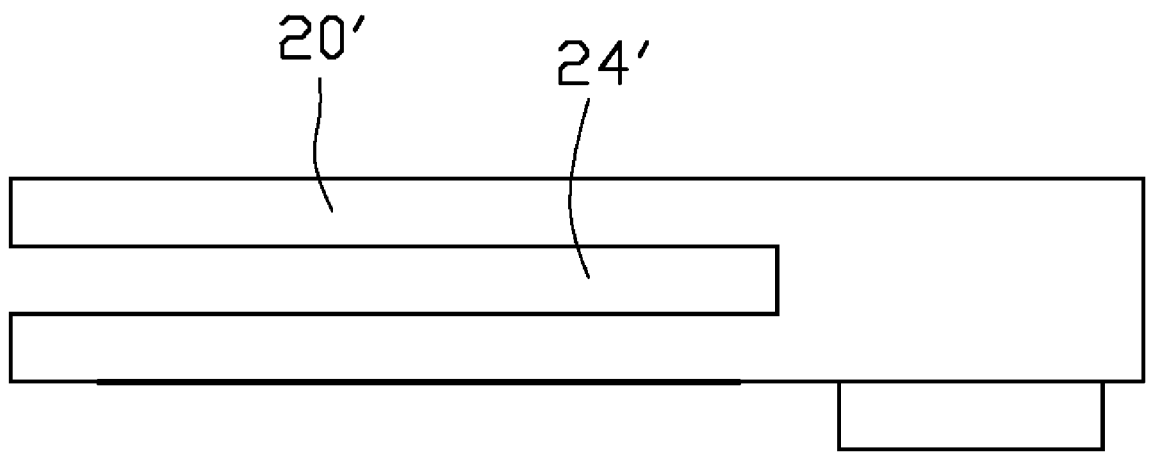
FIG. 5 is an isometric, schematic view of a breaking block of a clutch, according to another embodiment.

Each breaking block 20 includes a main body 21, a heating element 22, and an engaging block 23. The main body 21 includes an engaging surface 202 and an inserting end 204, and defines a second slot 24. The second slot 24 extends along a plane substantially parallel to the engaging surface 202, and forms a Y-branch at an end opposite to the inserting end 204, thereby, forming a deformable portion 25. Alternative, in other embodiments, a second slot 24' of a main body 20' can extend without the deformable portion 25 to facilitate manufacture of the main body 20' (see FIG. 5). The inserting end 204 is tightly inserted into a corresponding block-receiving portion 14 so that the engaging surface 202 faces the second end 12. The main body 21 is made from thermoplastic material, and can expand when is heated and contract when is cooled down. The thermoplastic material can be doped with heat-conductive particles to increase thermal deformation coefficient of the main body 21. In detail, the main body 21 can be made from general purpose polystyrene (GPPS), polymethyl methacrylate (PMMA), polycarbonate (PC), polyvinylchloride (PVC), or polybutylece terephthalate (PBT). In this embodiment, the main body 21 is made from PC. The heating element 22 is formed on the engaging surface 202 adjacent to the inserting end 204. The engaging block 23 is formed on the engaging surface 202 distal from the inserting end 204.

The driven member 102 is disc-shaped. The thickness of the driven member 102 is equal to the distance between the first through hole 13 and the block-receiving portions 14 of the rotatable shaft 10. The driven member 102 includes a mounting surface 102s, and defines a second through hole 102a and four engagement-receiving portions 102b in the mounting surface 102s. The second through hole 102a is in the center of the mounting surface 102s. The engagement-receiving portions 102b are of equal distance from the center and at 90 degrees from each other on the mounting surface 102s. The distance, of the engagement-receiving portions 102b, from the center of the mounting surface 102s is equal to the distance between the breaking block 20 and the center of the rotatable shaft 10. The four engagement-receiving portions 102b are shaped to receive the corresponding engaging blocks 23.

Figure 3:
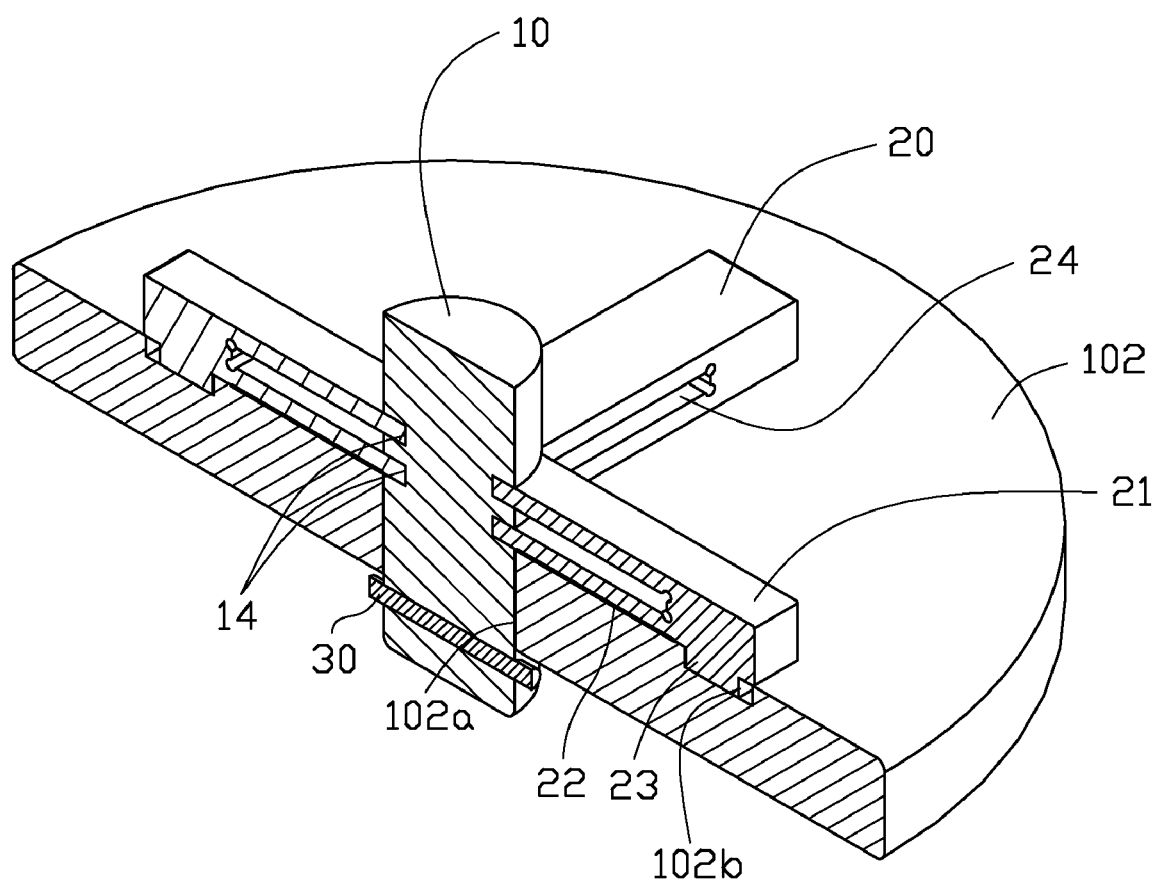
FIG. 3 is an assembled, isometric, cross-sectional, schematic view of the clutch of FIG. 1, which is in one state.

Referring to FIG. 3, in assembly, the rotatable shaft 10 is inserted through the second through hole 102a using the second end 12. The holding member 30 is inserted through the first through hole 13 so that the four engaging blocks 23 are correspondingly engaged with the four engagement-receiving portions 102b and the four breaking blocks 20 are in contact with the mounting surface 102s. The driving member 101 is engaged with the driven member 102 and can transmit rotational energy from the driving device to the driven device.

Figure 4:
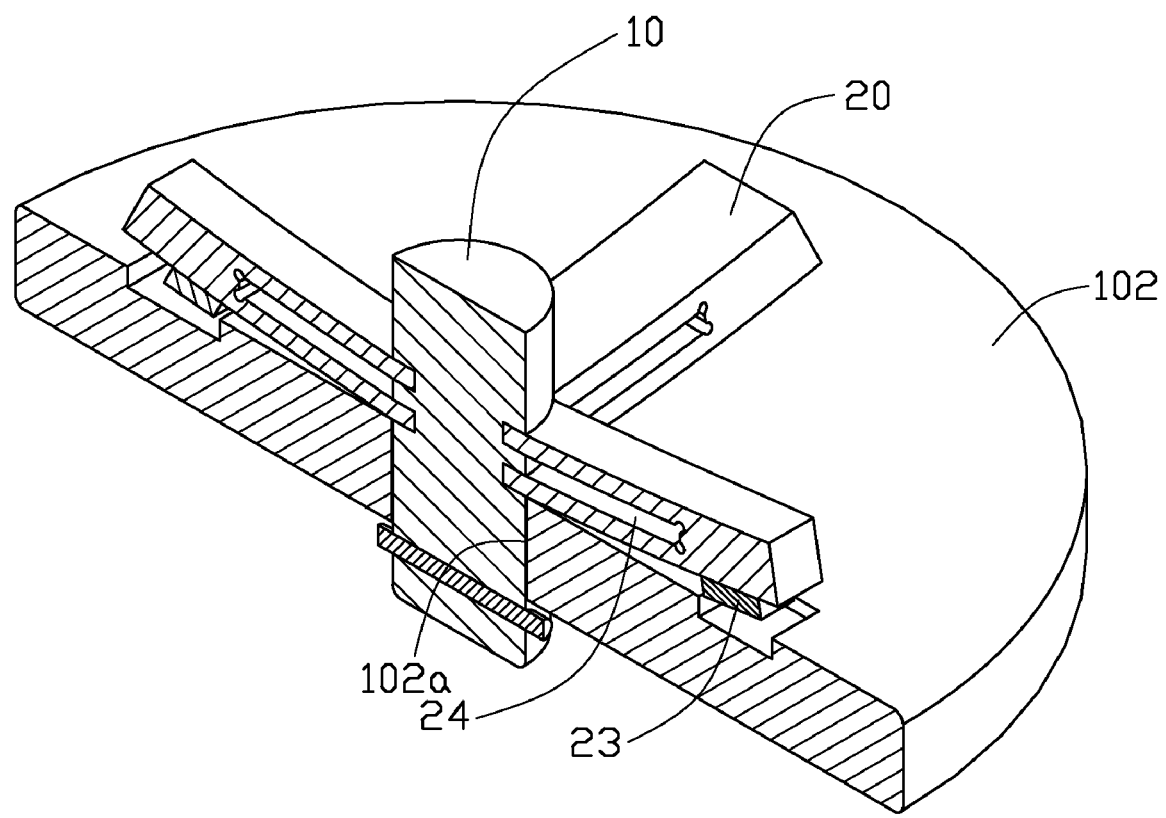
FIG. 4 is an assembled, isometric, cross-sectional, schematic view of the clutch of FIG. 1, which is in another state.

Also referring to FIG. 4, if the driving member 101 needs to disengage from the driven member to stop the driving device from being driven. Electrical power is applied to the heating element 22. The main bodies 21 are heated and bend upwards to disengage the four engaging blocks 23 from the engagement-receiving portions 102b. As a result, the driving member 101 becomes disengaged with the driven member 102.

It should be understood the second slots 24/24' are for increasing thermal deformation effect of the main body 21/20'. In other embodiments, they can be omitted if the thermal deformation coefficient of the main body 21/20' is large and quick enough to enable the clutch 100 to realize a desired disengagement.

It should be noted that driving member 101 and the driven member 102 can be assembled using other techniques, and therefore should not be limited to using the locking pin and the first through hole 13. For example, in an alternative embodiment, the rotatable shaft 10 can defines an annular groove (not shown), and the driving member 101 is assembled to the driven member 102 using a retaining ring (not shown). Even using the first through hole 13 and the locking pin, the positions and structures of the first through hole 13 and the locking pin are not limited to this embodiment, but can vary within the scope of the disclosure.

It should be mentioned that the four breaking blocks 20 are not limited to being fixed to the rotatable shaft 10 using the block-receiving portions 14 and the inserting end 204. Other alternative techniques can be used too. For example, in another exemplary embodiment, the breaking blocks 20 are integrally formed with the rotatable shaft 10.

It is to be understood that the number of the breaking blocks 20 and the engagement-receiving portions 102b is not limited to this embodiment, but can be set depending on design requirements. For example, in an alternative embodiment, only one breaking block is employed. Also, the positions of the breaking blocks 20 and the engagement-receiving portions 102b are not limited to this embodiment. For example, the four breaking blocks 20 and the four engagement-receiving portions 102b are not necessary to be equal-distantly distributed.

It is to be understood that elements from the three embodiments, to the degree practical, could potentially be combined and/or interchanged. Further, where a mating and/or fitting match between parts is prescribed, it is to be understood that such a fit should permit sliding therebetween to allow reasonably easy assembly/disassembly yet should be tight enough to otherwise minimize any potential lateral movement/vibration therebetween.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clutch comprising:
    a driving member comprising:
        a rotatable shaft; and
        a breaking block comprising:
            a thermally deformable main body fixed to the rotatable shaft;
            an engaging surface;
            a heating element; and
            an engaging block formed on the engaging surface;
    a driven member comprising a mounting surface and defining an engagement-receiving portion and a first through hole in the mounting surface; and
    a holding member configured for holding the driving member together with the driven member so that the rotatable shaft is rotatably inserted through the first through hole and the engaging block is engaged with the engagement-receiving portion; the heating element being configured for heating the main body to force the main body to bend the engaging block up away from the engagement-receiving portion.

2. The clutch as claimed in claim 1, wherein the rotatable shaft defines a second through hole, the holding member comprises a locking pin, and the locking pin is locked at the rotatable shaft by fittingly inserting through the second through hole to press the driven member against the engaging surface.

3. The clutch as claimed in claim 1, wherein the main body is made from a thermoplastic material.

4. The clutch claimed in claim 1, wherein the main body is doped with heat-conductive particles.

5. The clutch as claimed in claim 1, wherein the main body is made from a material selected from the group consisting of: general purpose polystyrene, polymethyl methacrylate, polycarbonate, polyvinylchloride, and polybutylene terephthalate.

6. The clutch as claimed in claim 1, wherein the main body is integrally formed with the rotatable shaft.

7. The clutch as claimed in claim 1, further comprising three other breaking blocks, the four breaking blocks being fixed to the rotatable shaft, the four engaging surfaces of the breaking blocks being substantially in the same plane, each two adjacent breaking blocks being about 90 degrees from each other, the driven member further defining three other engagement-receiving portions in the mounting surface, and the four engagement-receiving portions being of equal distance from the center of the mounting surface and at about 90 degrees from each other, the distance, of the block-receiving portions, from the center of the mounting surface being substantially equal to the distance between the engaging block and the center of the rotatable shaft.

8. The clutch as claimed in claim 1, wherein the main body defines a first slot, the first slot extends, along a plane substantially parallel to the engaging surface, from a first end of the main body.

9. The clutch as claimed in claim 8, wherein the rotatable shaft defines a block-receiving portion in the cylindrical surface thereof, the block-receiving portion is shaped so as to matingly receive the first end, and the breaking block is fixed to the rotatable shaft by tightly fitting the first end into the block-receiving portion.

10. The clutch as claimed in claim 9, wherein the block-receiving portion is two parallel first slots extending along the circumference of the rotatable shaft.

11. The clutch as claimed in claim 8, wherein the first slot forms a deformable portion at an end thereof opposite to the first end.

* * * * *